(12) United States Patent
Cholleti et al.

(10) Patent No.: US 7,827,374 B2
(45) Date of Patent: Nov. 2, 2010

(54) RELOCATING PAGE TABLES

(75) Inventors: Udayakumar Cholleti, Cupertino, CA (US); Sean McEnroe, North Borough, MA (US); Stan J. Studzinski, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 190 days.

(21) Appl. No.: 11/451,751

(22) Filed: Jun. 12, 2006

(65) Prior Publication Data

US 2007/0288718 A1    Dec. 13, 2007

(51) Int. Cl.
  G06F 12/00   (2006.01)
  G06F 13/00   (2006.01)
  G06F 13/28   (2006.01)
(52) U.S. Cl. .............................. 711/170; 711/E12.059
(58) Field of Classification Search ................. 711/206, 711/170, E12.059
  See application file for complete search history.

(56) References Cited

U.S. PATENT DOCUMENTS

| | | | |
|---|---|---|---|
| 4,787,031 A | 11/1988 | Karger et al. | |
| 4,961,134 A | 10/1990 | Crus et al. | |
| 5,440,746 A | 8/1995 | Lentz | |
| 5,574,944 A | 11/1996 | Stager | |
| 5,577,231 A | 11/1996 | Scalzi et al. | |
| 5,659,798 A | 8/1997 | Blumrich et al. | |
| 5,765,198 A | 6/1998 | McCrocklin et al. | |
| 5,802,341 A * | 9/1998 | Kline et al. | 711/209 |
| 5,835,964 A * | 11/1998 | Draves et al. | 711/207 |
| 5,918,244 A | 6/1999 | Percival | |
| 6,052,699 A | 4/2000 | Huelsbergen et al. | |
| 6,085,296 A * | 7/2000 | Karkhanis et al. | 711/147 |
| 6,125,430 A * | 9/2000 | Noel et al. | 711/152 |
| 6,145,064 A * | 11/2000 | Long et al. | 711/158 |
| 6,349,355 B1 | 2/2002 | Draves et al. | |
| 6,366,994 B1 | 4/2002 | Kalyur | |
| 6,553,435 B1 | 4/2003 | Normoyle et al. | |
| 6,594,708 B1 | 7/2003 | Slaughter et al. | |
| 6,622,226 B1 | 9/2003 | Dussud | |
| 6,804,729 B2 | 10/2004 | Swanberg | |

(Continued)

OTHER PUBLICATIONS

Armstrong et al., "Advanced Virtualization Capabilities of POWER5 Systems," Sep. 6, 2005.*

(Continued)

*Primary Examiner*—Sheng-Jen Tsai
(74) *Attorney, Agent, or Firm*—Osha • Liang LLP

(57) ABSTRACT

According to one embodiment of the invention, a technique is provided for relocating the contents of kernel pages in a manner similar to techniques used for relocating the contents of user pages. Before the contents of a source page are moved to a target page, for each entry of a plurality of entries that correspond to the source page, it is determined whether a mapping indicated in that entry is a mapping into kernel virtual memory address space or user virtual memory address space. If the mapping is into user virtual memory address space, then the entry is marked invalid. If the mapping is into kernel virtual memory address space, then the mapping is marked suspended. Marking an entry suspended causes processes and threads that try to access the entry's mapping to wait until the entry is no longer marked suspended. Consequently, kernel pages may be distributed among all computing system boards.

21 Claims, 10 Drawing Sheets

U.S. PATENT DOCUMENTS

| | | | |
|---|---|---|---|
| 6,922,765 | B2 | 7/2005 | Jacobs |
| 7,007,146 | B2* | 2/2006 | Romanufa et al. ......... 711/165 |
| 7,093,097 | B2 | 8/2006 | Herr et al. |
| 7,159,094 | B1 | 1/2007 | Cholleti et al. |
| 7,500,073 | B1* | 3/2009 | Cholleti et al. ............. 711/165 |
| 7,562,204 | B1* | 7/2009 | Cholleti et al. ............. 711/206 |
| 7,721,068 | B2* | 5/2010 | Lowe et al. ................. 711/206 |
| 2002/0108025 | A1 | 8/2002 | Shaylor |
| 2004/0015622 | A1 | 1/2004 | Avery |
| 2004/0187135 | A1* | 9/2004 | Pronovost et al. ........... 718/104 |
| 2005/0050295 | A1* | 3/2005 | Noel et al. ................... 711/206 |
| 2005/0086451 | A1 | 4/2005 | Yates et al. |
| 2005/0120080 | A1* | 6/2005 | Weinreb et al. ............. 709/203 |
| 2005/0144422 | A1 | 6/2005 | McAlpine et al. |
| 2005/0240748 | A1 | 10/2005 | Yoder |
| 2005/0289550 | A1* | 12/2005 | Blackmore et al. .......... 718/102 |
| 2006/0064562 | A1 | 3/2006 | Mohideen et al. |
| 2006/0107020 | A1 | 5/2006 | Stillwell et al. |
| 2006/0236063 | A1* | 10/2006 | Hausauer et al. ............ 711/170 |
| 2006/0282839 | A1* | 12/2006 | Hankins et al. ............. 719/318 |
| 2006/0294165 | A1 | 12/2006 | Bacon et al. |
| 2007/0038891 | A1 | 2/2007 | Graham |
| 2007/0169024 | A1 | 7/2007 | Drepper |
| 2007/0288718 | A1 | 12/2007 | Cholleti et al. |
| 2008/0005495 | A1 | 1/2008 | Lowe et al. |

OTHER PUBLICATIONS

"Mechanism for Dynamic Registering and Notifying Hypervisor Clients of Updates to High-UseTranslation Control Entries,"Aug. 6, 2004.*

Gibbs et al., "Advanced POWER Virtualization on IBM eServer p5 Servers," Nov. 2005.*

Matsubara, "IBM eServer pSeries 670 and pSeries 690 System," Jan. 2005.*

"Solaris 10 What's New" Sun Microsystems 4150 Network Circle, Santa Clara CA 95054,USA, PartNo.: 817-0547-18, May 2006, pp. 1-162.

"Mechanism for Dynamic Registering and Notifying Hypervisor Clients . . . ", Aug. 6, 2004.

Gibbs,"Adv. Power Virtualization on IBM eServer p5 Servers", Nov. 2005.

Armstrong,"Adv. Virtualization capabilities of POWER5 systems", Sep. 6, 2005.

Matsubara,"IBM eServer pSeries 670 and pSeries 690 System . . . " 2004.

Rubini et al., "Linux Device Driver", $2^{nd}$ Edition, Jun. 2001, Chapter 2 and 13, 95 pages.

HP, "A C++/HP C Programmers Guide", Edition 3, Sep. 2004. (document not included in 15437-0736 Office Action dated Apr. 17, 2008 or in PAIRS, therefore no copy has been provided).

Corsi, CS372 class notes 11-13 from www.cs.utexas.edu/users/lorenzo/corsi/cs372/03F/notes/11-13.pdf, Nov. 21, 2003, 5 pages.

McDougall et al., "Solaris Internals Kernel Architecture & Implementation", 2001, 128 pages.

\* cited by examiner

RELOCATING PAGE TABLES

BACKGROUND

The physical memory of a computing system is usually divided into physical pages. Each physical page is the same size in bytes. For example, in some computing systems, each physical page is 8192 bytes long. Each physical page has a unique page frame number (PFN). A physical page's PFN may be determined by dividing the starting physical memory address of that physical page by the page size. Thus, in a system in which each physical page contains 8192 bytes, the PFN of a physical page that contains physical memory addresses 0 through 8191 is 0, the PFN of a physical page that contains physical memory addresses 8192 through 16383 is 1, and the PFN of a physical page that contains physical memory address 16384 through 24575 is 2.

In many computing systems that employ a virtual memory management scheme, virtual memory address space is segregated into "user" virtual memory address space and "kernel" virtual memory address space. Each executing user process has its own user virtual memory address space. The system kernel has its own kernel virtual memory address space. Some physical pages are mapped into the user virtual memory address space, and some physical pages are mapped into the kernel virtual memory address space. Inasmuch as multiple user processes may share the same data, some of the virtual memory address space of each of two or more user process may be mapped to the same physical pages. In fact, a physical page that is mapped to user virtual memory address space may be concurrently mapped to kernel virtual memory address space, at least temporarily.

Each physical-to-virtual page mapping has a corresponding entry in a Translation Lookaside Buffer (TLB), which is typically implemented in hardware. Usually, when a process attempts to access data at a particular virtual address, it invokes a mechanism called the virtual memory subsystem. The virtual memory subsystem first attempts to find the relevant virtual-to-physical page mapping in the TLB, using the virtual address as a key. If the virtual memory subsystem cannot find a relevant, valid mapping in the TLB (a circumstance called a "TLB miss"), then the virtual memory subsystem attempts to find a relevant, valid mapping in a Translation Storage Buffer (TSB), which is similar in structure to the TLB, but larger and slower, and typically implemented in software. If the virtual memory subsystem cannot find a relevant, valid mapping in the TSB (a circumstance called a "TSB miss"), then the virtual memory subsystem attempts to find a relevant, valid mapping in "page tables," which are implemented as hash tables. If the virtual memory subsystem cannot find a relevant, valid mapping in the page tables (a circumstance called a "page fault"), then the virtual memory subsystem invokes a mechanism called the "page fault handler." The page fault handler locates a relevant, valid mapping using information within kernel internal tables, which may refer to persistent storage. Significantly, the kernel internal tables are stored in physical pages that are mapped to the kernel virtual memory address space.

A computing system may comprise multiple system boards. Each system board may comprise one or more CPUs and some physical memory. Each system board has a different range of physical memory addresses that does not overlap with any other system board's range of physical memory addresses.

Sometimes, a particular system board may be experiencing errors. Under such circumstances, it may be desirable to remove that system board from the computing system.

A large computing system may be logically divided into multiple separate domains. Each domain may be allocated one or more system boards. Each domain may be used by a different group of users for different purposes. For example, one domain might be used to run a web server. Another domain might be used to run a database.

At some point in time, it may become desirable to change the allocation of system boards to domains. Under some circumstances, it might be desirable to change the allocation on a regular basis (e.g., daily), automatically and dynamically. It is better for such reallocation to be performed with minimum disruption to the computing system and the processes executing thereon. For example, it is better for such reallocation to be performed without shutting down and rebooting the entire computing system, because rebooting the entire computing system can be a relatively time-consuming process. Usually, user processes cannot execute during much of the time that a computing system is rebooting.

Whenever a system board is going to be removed from a computing system, or whenever a system board is going to be allocated to a different domain, the data stored in that system board's physical pages needs to be relocated to the physical pages of another system board. Relocation involves moving the data that is stored in one set of physical pages to another set of physical pages.

When a user process' data need to be relocated, the data may be moved from the "source" physical pages to other "target" physical pages that have different PFNs. Before the data are moved, all entries (in the TSB, the TLB, and the page tables) that contain physical-to-virtual page mappings that correspond to the "source" physical pages are marked "invalid" so that no processes will be able to access the "source" physical pages during the relocation. The relevant physical-to-virtual page mappings are modified so that the appropriate "target" physical pages, to which the data have been moved, are mapped to the same virtual pages to which the "source" physical pages were mapped. The modified mappings are stored in the TLB, the TSB, and the page tables, and the entries containing the modified mappings are marked "valid." The user process continues to access its data using the same virtual addresses.

According to current approaches, a page fault handler is not invoked in response to a page fault that involves a mapping of a physical page to the kernel virtual memory address space. This is because the kernel internal tables that contain the mapping for which the page fault handler would be searching are stored in a physical page that is, itself, mapped to the kernel virtual memory address space. If the contents of that physical page were currently being relocated, then the virtual memory subsystem would not be able to locate a valid virtual-to-physical page mapping for that physical page in the TLB, the TSB, or the page tables; all of the entries containing that mapping would have been invalidated due to the relocation. An unending recursive cascade of page faults and page fault handler invocations would likely result, causing the entire computing system to fail.

Because a page fault handler is not invoked in response to a page fault that involves a mapping of a physical page to a virtual page that is in the kernel virtual memory address space, under current approaches, physical pages that are mapped to the kernel's virtual memory address space can only be relocated through a firmware-implemented technique.

Under the aforementioned firmware-implemented technique, all of the user processes executing in the computing system are quiesced (i.e., placed in a "suspended" state). Then, for each driver in the computing system, a "suspend entry point" for that driver is called. As a result, all of the drivers are quiesced as well. Then, all of the CPUs in the computing system, except for one CPU on a system board other than the "source" system board, are quiesced. Then the firmware of the one CPU that was not quiesced reads data from the "source" physical pages of the "source" system board and stores that data in the previously unoccupied "target" physical pages of a "target" system board. The firmware configures the physical memory addresses on the "target" system board to be the same as the physical memory addresses on the "source" system board. After the data has been copied from the "source" system board to the "target" system board, the "source" system board is removed from the computing system, the quiesced CPUs are resumed, the quiesced drivers are resumed, and the quiesced user processes are resumed.

When using the firmware-implemented relocation technique, the physical memory addresses on the "target" system board need to be the same as those on the "source" system board because, as is discussed above, it is not safe to invoke a page fault handler in response to a page fault that involves a mapping of a physical page to the kernel virtual memory address space. Therefore, under current approaches, all physical addresses that could be referenced by kernel processes need to remain the same throughout the relocation. This need makes it impractical for kernel virtual memory address space-mapped physical pages (hereinafter referred to as "kernel pages") to be spread throughout all of the system boards in a computing system.

For example, if kernel pages were distributed among all "N" of the system boards of a computing system, then relocating the data stored in those kernel pages would require an additional "N" more "target" system boards. The physical memory addresses on a given system board are required to be contiguous, so it is not possible, using the firmware-implemented technique, to move data from "N" "source" system boards onto fewer than "N" "target" system boards; at least "N" "target" system boards are required. However, it is usually not economically feasible to keep such a potentially large number of unused spare "target" system boards available.

Under one approach, sparsely populated system boards can be made into spare "target" system boards by moving user process data off of those system boards to other, more densely populated system boards. However, even this approach does not completely obviate the need to maintain all kernel pages within a limited subset of system boards.

Consequently, under current approaches, all of the kernel pages are confined to a limited subset of all of the system boards in a computing system, to compensate for the possibility that one or more of the system boards in that subset might be replaced at some point in time.

This confinement of kernel pages to a limited subset of all of the system boards has some negative consequences. Thousands of user processes might be concurrently executing on various system boards. At any given moment, many of these user processes may cause accesses to the kernel pages (e.g., as a result of page faults). Because all of the kernel pages are located on the same limited subset of system boards under current approaches, the input/output resources of the system boards in the limited subset are often subject to heavy contention. The overall performance of the entire computing system may be degraded as a result.

In order to reduce the contention on a limited subset of system boards, and thereby enhance overall computing system performance, techniques are needed for allowing kernel pages to be distributed among any or all of the system boards in a computing system.

SUMMARY

In accordance with one embodiment of the present invention, there is provided a technique for allowing the contents of kernel pages to be relocated in a manner similar to that used for relocating the contents of user virtual memory address space-mapped physical pages (hereinafter referred to as "user pages"). As a consequence of the technique, kernel pages may be distributed among any or all of the system boards in a computing system. The wider distribution of kernel pages reduces the contention on each of the system boards, which, in turn, enhances overall computing system performance.

According to one embodiment of the invention, before the contents of a source page are moved to a target page, for each entry of a plurality of entries that correspond to the source page, it is determined whether a mapping indicated in that entry is (a) a mapping into kernel virtual memory address space or (b) a mapping into user virtual memory address space. If the mapping is a mapping into user virtual memory address space, then the entry that indicates the mapping is marked invalid. Alternatively, if the mapping is a mapping into kernel virtual memory address space, then the mapping is not marked invalid, but is marked suspended. Marking an entry suspended causes processes and threads that try to access the entry's mapping to wait until the entry is no longer marked suspended. Only after this determination has been made for each entry in the plurality of entries are the contents of the source page moved to the target page.

Because entries that indicate mappings into kernel virtual memory address space remain valid, no page fault occurs when a process or thread attempts to access the mappings indicated in those entries during the relocation process. As a result, kernel pages do not need to be relocated using the firmware-implemented technique described in the Background above. Consequently, kernel pages may be distributed among any or all of the system boards in a computing system.

DETAILED DESCRIPTION OF EMBODIMENT(S)

Overview

Figure 1:
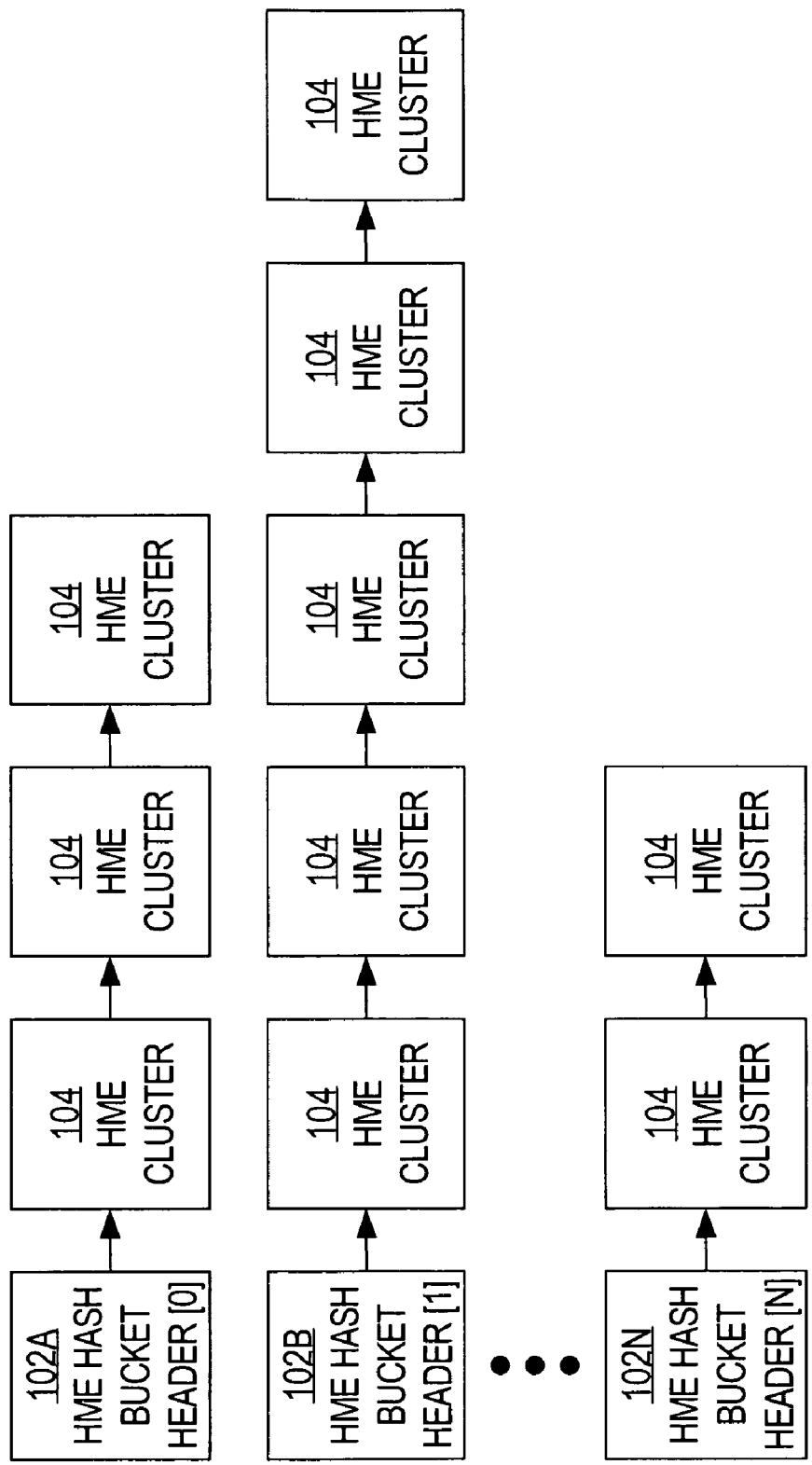
FIG. 1 is a block diagram that illustrates an example of the structure and organization of page tables, according to an embodiment of the invention.

According to one embodiment of the invention, for each physical page (including kernel pages), there is a corresponding "page-t" data structure within the page tables. According to one embodiment of the invention, whenever a computing system boots up, a separate page-t structure is allocated for each physical page in the computing system. According to one embodiment of the invention, whenever memory is dynamically added to a computing system, a separate page-t structure is allocated for each physical page in the dynamically added memory. According to one embodiment of the invention, each page-t structure indicates the PFN of the physical page to which that page-t structure corresponds.

According to one embodiment of the invention, each page-t structure additionally contains a pointer or reference to a linked list of "Translation Table Entries" (TTEs). For each virtual page that is mapped to a page-t structure's corresponding physical page, the linked list to which that page-t structure points contains a TTE that indicates a mapping between that virtual page and the page-t structure's corresponding physical page. Thus, the linked list to which a page-t structure refers indicates all of the virtual pages that are mapped to that page-t structure's corresponding physical page.

According to one embodiment of the invention, whenever the contents of a "source" physical page are going to be relocated, a relocation thread exclusively locks the "source" physical page so that no other processes or threads can read from or write to the contents of the "source" physical page. The relocation thread also exclusively locks the "target" physical page to which the contents are going to be moved, so that no other processes or threads can read from or write to the "target" physical page. The relocation thread marks "invalid," in the TLB and the TSB, all mappings to the "source" physical page. In some computing systems, there are separate TLBs on each system board. In such computing systems, the relocation thread generates a "cross call" that marks "invalid" the relevant mappings in all TLBs on all system boards. Marking mappings invalid is sometimes called "flushing" or "unloading" the mappings.

Next, using the "source" physical page's PFN, the relocation thread locates the "source" physical page's corresponding page-t structure in the page tables. The relocation thread traverses the linked list of TTEs to which the page-t structure refers (hereinafter referred to as the "source linked list"). For each such TTE that indicates a mapping to user virtual memory address space, the relocation thread marks that TTE "invalid." For each such TTE that indicates a mapping to kernel virtual memory address space, the relocation thread marks that TTE "suspended" (e.g., by setting a "suspend" bit in that TTE), but does not mark that TTE "invalid," because doing so could later cause a page fault.

Next, the relocation thread moves the contents of the "source" physical page to the "target" physical page. Next, for each "valid" but "suspended" TTE in the source linked list, the relocation thread moves that TTE to a linked list to which the "target" physical page's corresponding page-t structure refers (hereinafter the "target linked list"). Thus, only TTEs that indicate mappings to user virtual memory address space remain in the source linked list.

In one embodiment of the invention, each TTE indicates the PFN that is indicated in the page-t structure that refers to the linked list that contains that TTE. In such an embodiment of the invention, after the appropriate TTEs have been moved to the target linked list as described above, the PFNs indicated in those TTEs are updated to indicate the PFN that is indicated in the page-t structure that refers to the target linked list.

After all of the above has been done, the relocation thread updates each of the moved TTEs to indicate that those TTEs are no longer "suspended" (e.g., by clearing a "suspend" bit in such TTEs). The relocation thread updates kernel internal tables that the page fault handler would consult in the event of a page fault. As a result of the update, all existing mappings between virtual addresses and the "source" physical page's corresponding page-t structure are changed, in the kernel internal tables, to mappings between those virtual addresses and the "target" physical page's corresponding page-t structure. The relocation thread then releases the exclusive locks from both the "source" and "target" physical pages.

Whenever a particular process or thread other than the relocation thread attempts to access the "source" physical page while the contents of the "source" physical page are being relocated, the virtual memory subsystem determines that the TLB and TSB entries that contain the relevant virtual-to-physical page mapping are marked "invalid" (resulting in TLB and TSB misses). As a result of this determination, the virtual memory subsystem seeks a relevant, valid mapping in the page tables. The virtual memory subsystem locates, in the page tables, the TTE that contains the relevant mapping.

If the relevant mapping maps the "source" physical page into kernel virtual memory, then the virtual memory subsystem ascertains that the TTE is marked "valid," but "suspended." Because the TTE is marked "valid," no page fault occurs. In response to ascertaining that the TTE is marked "suspended," the virtual memory subsystem instructs the particular process or thread to wait until the TTE is no longer marked "suspended." When the TTE is no longer marked "suspended," the particular process or thread stops waiting. The particular process or thread's attempt to access the virtual page causes a "miss handler" mechanism to be invoked. The miss handler loads the relevant, valid mapping from the TTE into the TSB and the TLB, and then causes the particular process' or thread's last executed program instruction (which caused a TLB miss and a TSB miss) to be re-executed. When the program instruction is re-executed, the virtual memory subsystem finds a relevant, valid mapping in the TLB.

Alternatively, if the relevant mapping maps the "source" physical page into user virtual memory, then the virtual memory subsystem ascertains that the TTE is marked "invalid." Because the TTE is marked "invalid," a page fault occurs. The virtual memory subsystem instructs the particular process or thread to wait. After the relocation thread releases the exclusive locks on the "source" and "target" physical pages as described above, the page fault handler uses the updated kernel internal tables to create a valid TTE in the target linked list. In the same manner as described above, the "miss handler" loads the relevant mapping from the valid TTE into the TSB and the TLB, and then causes the particular process' or thread's last executed program instruction to be re-executed.

As a result of the foregoing techniques, kernel pages do not need to be relocated using the firmware-implemented technique described in the Background above. Consequently, kernel pages may be distributed among any or all of the system boards in a computing system.

In some computing systems, some processes (e.g., kernel processes) might access physical pages using the physical pages' physical memory addresses rather than virtual memory addresses that are mapped to those physical memory addresses. This kind of access is often called "direct memory access," or "DMA." After the contents of a "source" physical page have been relocated, the processes that had been accessing that physical page using DMA need to be apprised of the physical memory address of the "target" physical page to which the contents have been relocated; if those processes continued to use the physical memory address of the "source" physical page to perform DMA, then those processes would not be accessing the correct contents.

Therefore, in one embodiment of the invention, for each process that performs direct memory access relative to a physical page, the linked list to which that physical page's corresponding page-t structure refers contains a special TTE. The virtual-to-physical page mapping indicated in the special TTE identifies the physical page in place of a virtual page. The special TTE indicates (e.g., via a set bit) that it is a special TTE.

According to one embodiment of the invention, the special TTE contains a reference to a "pre-handler" mechanism and a reference to a "post-handler" mechanism. These handler mechanisms are customized to interact with a particular process. Thus, different special TTEs may contain references to different handler mechanisms. In such an embodiment, before a particular process uses DMA relative to a physical page, that process provides, to a registration mechanism, references to the handler mechanisms that are customized for that particular process. The registration mechanism adds, to the linked list to which the physical page's corresponding page-t structure refers, a special TTE that contains the references to the handler mechanisms.

In such an embodiment, whenever the contents of a "source" physical page are going to be relocated, the relocation thread traverses the source linked list as described above. Whenever the relocation thread locates a special TTE in the source linked list, the relocation thread invokes the pre-handler mechanism to which that special TTE refers. Each pre-handler mechanism, when invoked, causes its corresponding process to desist from attempting to access the "source" physical page (which may be identified as a parameter of the invocation of the pre-handler mechanism) using DMA until instructed otherwise. After the contents of the "source" physical page have been moved to the "target" physical page, as described above, the relocation thread again traverses the source linked list. This time, whenever the relocation thread locates a special TTE in the source linked list, the relocation thread invokes the post-handler mechanism to which that special TTE refers. Each post-handler mechanism, when invoked, may instruct its corresponding process that the previously halted DMAs may resume. The post-handler mechanism for a particular process may invoke a mechanism that causes a physical memory address to be "re-fetched" so that relevant mappings, such as that contained in the special TTE, are updated to refer to the "target" physical page instead of the "source" physical page.

Example Page Table Structure

As is discussed above, in one embodiment of the invention, when a TSB miss occurs, the virtual memory subsystem looks for a relevant, valid virtual-to-physical page mapping in the page tables. FIG. 1 is a block diagram that illustrates an example of the structure and organization of page tables, according to an embodiment of the invention.

According to one embodiment of the invention, the page tables are implemented as hash tables. FIG. 1 shows hardware mapping entry ("HME") hash bucket headers 102A-N and HME clusters 104. Each of HME hash bucket headers 102A-N corresponds to a different hash value. For example, HME hash bucket header 102A corresponds to a hash value of 0, HME hash bucket header 102B corresponds to a hash value of 1, and HME hash bucket header 102N corresponds to a hash value of N. The hash value to which an HME hash bucket header corresponds indicates the position of that HME hash bucket header in an array of HME hash bucker headers 102A-N. In one embodiment of the invention, each of HME hash bucket headers 102A-N is associated with a separate mutually exclusive ("mutex") lock that may be granted to and released by processes and threads.

One or more of HME hash bucket headers 102A-N points or refers to a separate linked list of HME clusters 104. For example, HME hash bucket header 102A is shown pointing to a linked list of 3 HME clusters 104, HME hash bucket header 102B is shown pointing to a linked list of 5 HME clusters 104, and HME hash bucket header 102N is shown pointing to a linked list of 2 HME clusters 104. The internal structure of each of HME clusters 104 is described below.

According to one embodiment of the invention, each of HME clusters 104 corresponds to a separate 64-kilobyte region in the virtual memory address space of some process that is executing on the computing system. Two or more of HME clusters 104 may correspond to different regions of the virtual memory address space of the same process. Each such process has a unique process identifier that also uniquely identifies that process' virtual memory address space.

An HME cluster is a specific type of "buffer." According to one embodiment of the invention, each HME cluster is approximately 400 bytes in size. Thus, in a computing system in which the physical page size is 8192 bytes, a single physical page may store up to 20 separate HME clusters. In one embodiment of the invention, any physical page that contains HME clusters contains only HME clusters, along with metadata for that physical page. The metadata may indicate, for example, that the physical page contains buffers that are of the HME cluster type. Thus, physical pages that contain HME clusters may be internally "homogeneous." A physical page that contains HME clusters is also called a "slab."

The metadata may additionally comprise a "buffer control" structure for the physical page. The buffer control structure may indicate, for example, which of the physical page's HME clusters are currently allocated to processes' virtual memory address spaces, which of the physical page's HME clusters are currently available for allocation to a process' virtual memory address space, how many of the physical page's HME clusters are currently allocated to processes' virtual memory address spaces, and/or the identities of the processes to whose virtual memory address spaces the HME clusters are currently allocated.

According to one embodiment of the invention, a separate "kmem-cache" structure is maintained, in at least one of the kernel pages, for each type of buffer in the computing system. The kmem-cache structure for the "HME cluster" buffer type identifies which physical pages currently store HME clusters, and which of those physical pages has at least one HME cluster that is currently available for allocation to a process' virtual memory address space.

Example HME Cluster

Figure 2:
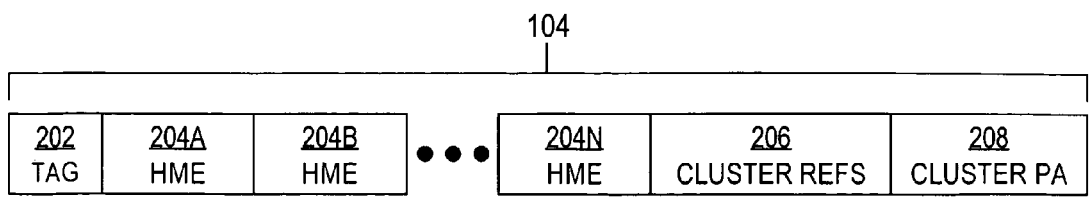
FIG. 2 is a block diagram that illustrates an example of the internal structure of a single HME cluster, according to an embodiment of the invention.

FIG. 2 is a block diagram that illustrates an example of the internal structure of a single HME cluster, according to an embodiment of the invention. HME cluster 104 comprises a tag 202, a block or "cluster" of HMEs 204A-N, HME cluster references 206, and an HME cluster physical address ("PA") 208. According to one embodiment of the invention, HME cluster 104 comprises a cluster of 8 HMEs 204A-N. Thus, each of HMEs 204A-N is located at a different offset from the start of HME cluster 104.

When HME cluster 104 is initially populated, the contents of tag 202 are hashed using a hash function to generate a hash key. One of hash bucket headers 102A-N corresponds to the hash key. HME cluster 104 is added to the linked list to which that HME hash bucket header refers. The internal structures of tag 202 and each of HMEs 204A-N are described below.

According to one embodiment of the invention, HME cluster references 206 comprise a reference or pointer to the next HME cluster in the linked list that contains HME cluster 104, if there is a next HME cluster in that linked list. For example, HME cluster references 206 may comprise both a physical address and a virtual address of the next HME cluster in the linked list. The virtual memory subsystem may use HME cluster references 206 to traverse the linked list. Because HME cluster references 206 contain physical addresses in one embodiment of the invention, the linked list can be traversed without the possibility of causing a page fault.

HME cluster PA 208 indicates the physical address of HME cluster 104. When HME cluster 104 is initially allocated in memory, HME cluster PA 208 is populated. When HME cluster 104 is added to a linked list to which one of HME hash bucket headers 102A-N refers, the HME cluster references of the HME cluster preceding HME cluster 104 are updated to indicate the value of HME cluster PA 208, thus creating the link between the two HME clusters in the linked list.

In an alternative embodiment of the invention, instead of containing separate HME cluster references 206 and HME cluster PA 208, HME cluster 104 contains a unified field that indicates the physical address of HME cluster 104 until another HME cluster is appended to the linked list after HME cluster 104. At that time, the unified field is updated to indicate the physical address of the HME cluster that was appended to the linked list.

According to one embodiment of the invention, the virtual memory subsystem locates a relevant virtual-to-physical page mapping as part of a "mapping lookup operation" using the following technique. First, the virtual memory subsystem concatenates (a) the process identifier of the process that is attempting to access a particular virtual address, (b) a base virtual address that is derived based on the particular virtual address, and (c) the size of each of HMEs 204A-N. The concatenation forms a tag key.

Next, the virtual memory subsystem hashes the tag key using the aforementioned hash function to produce a hash key. In an array of HME hash bucket headers, such as HME hash bucket headers 102A-N shown in FIG. 1, the virtual memory subsystem uses the hash key as an array index to locate the HME hash bucket header that corresponds to the hash key. The virtual memory subsystem obtains ownership of the mutex lock that is associated with that HME hash bucket header. While the virtual memory subsystem has ownership of the mutex lock, no other process or thread can modify the linked list of HME clusters to which the HME hash bucket header refers.

Then, the virtual memory subsystem traverses the linked list of HME clusters to which the appropriate HME hash bucket header refers. For each HME cluster in the linked list, the virtual memory subsystem compares that HME cluster's tag with the tag key. If that HME cluster's tag matches the tag key, then the virtual memory subsystem concludes that the HME cluster contains the relevant mapping. Using information contained in the appropriate HME cluster, the virtual memory subsystem performs further actions that are described below.

Figure 3:
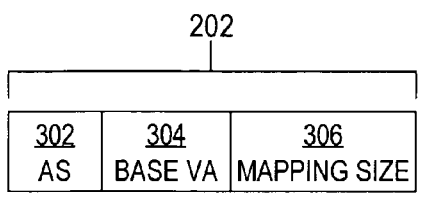
FIG. 3 is a block diagram that illustrates an example of the internal structure of a tag, according to an embodiment of the invention.

FIG. 3 is a block diagram that illustrates an example of the internal structure of a tag, such as tag 202, according to an embodiment of the invention. Tag 202 comprises an address space ("AS") identifier 302, a base virtual address ("VA") 304, and a mapping size indicator 306.

AS identifier 302 indicates a process identifier of a process to which the HME cluster that contains tag 202 corresponds. Each process is associated with its own virtual memory address space, which is independent of every other process' virtual memory address space, so in order to translate a virtual address into a physical address, the process in whose virtual memory address space that virtual address is located needs to be known. In one embodiment of the invention, a kernel process has a special process identifier that no user process ever has. Thus, whether or not a particular virtual memory address space is kernel virtual memory address space can be ascertained from AS identifier 302.

Base VA 304 indicates the virtual address that corresponds to the first (zero-offset) HME 204A in HME cluster 104. Because the virtual address of each HME in HME cluster 104 can be deduced based on base VA 304 and that HME's position in HME cluster 104, there is no need for the HMEs to contain their respective virtual addresses. Mapping size indicator 306 indicates the size of each of HMEs 204A-N.

Example HME

Figure 4:
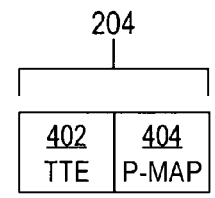
FIG. 4 is a block diagram that illustrates an example of the internal structure of a HME, according to an embodiment of the invention.

FIG. 4 is a block diagram that illustrates an example of the internal structure of a HME, such as any one of HMEs 204A-N, according to an embodiment of the invention. HME 204 comprises a TTE 402 and a "p-map" structure 404. TTE 402 is a TTE of the kind that is discussed above in the Overview. As is discussed above, TTE 402 indicates a virtual-to-physical page mapping. The internal structure of TTE 402 is described below.

A relocation thread can use "p-map" 404 to traverse a source linked list of TTEs during a relocation operation, as is described above in the Overview. According to one embodiment, "p-map" 404 contains a reference or pointer to a next TTE in the source linked list of which TTE 402 is a part. TTE 402 and the next TTE may be in separate HME clusters. Thus, when a relocation thread traverses a source linked list, the relocation thread may read TTEs within several separate HME clusters.

Figure 5:
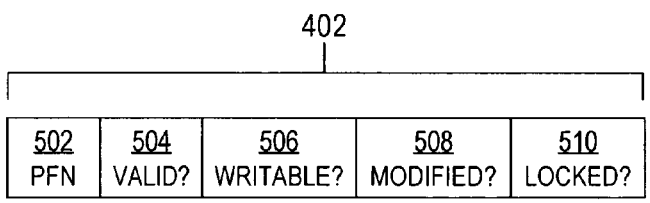
FIG. 5 is a block diagram that illustrates an example of the internal structure of a TTE, according to an embodiment of the invention.

FIG. 5 is a block diagram that illustrates an example of the internal structure of a TTE, such as TTE 402, according to an embodiment of the invention. TTE 402 comprises a PFN 502, a validity indicator 504, a writability indicator 506, a modified status indicator 508, and a locked status indicator 510. Locked status indicator 510 indicates whether the physical page to which PFN 502 corresponds is locked. Validity indicator 504 indicates whether TTE 402 is valid or invalid. In one embodiment of the invention, validity indicator 504 additionally indicates whether TTE 402 is suspended.

In one embodiment of the invention, whenever validity indicator 504 is set to indicate that TTE 402 is invalid, a determination is made as to whether all of the TTEs in the same HME cluster as TTE 402 are also invalid. In such an embodiment, if all of the TTEs in that HME cluster are invalid, then the entire HME cluster is removed from the linked list that contains that HME cluster. When an HME cluster is removed in this manner, the HME cluster may be maintained and placed in a pool of available HME clusters. When an HME cluster needs to be allocated to a process, instead of creating an entirely new HME cluster, a kernel memory allocator mechanism may provide, to the process, one of the HME clusters in the pool.

TTE 402 indicates a virtual-to-physical page mapping by virtue of PFN 502: PFN 502 corresponds to a physical page, and base VA 304 corresponds to a virtual address, to which the offset of HME 204 from the start of HME cluster 104 may be added to produce the virtual address of a virtual page that is mapped to that physical page.

Thus, in one embodiment of the invention, after locating the correct HME cluster during a mapping lookup operation, as discussed above, the virtual memory subsystem performs arithmetic to determine which of the HMEs in that HME cluster corresponds to the virtual page. If the TTE in that HME is marked "valid" and is not marked "suspended," then the virtual memory subsystem concludes that the PFN indicated in that TTE corresponds to the physical page to which the virtual page is mapped. The virtual memory subsystem relinquishes ownership of the mutex lock that is associated with the HME hash bucket header that refers to the linked list that contains the HME cluster that contains the HME.

Example P-mapping List

Figure 6:
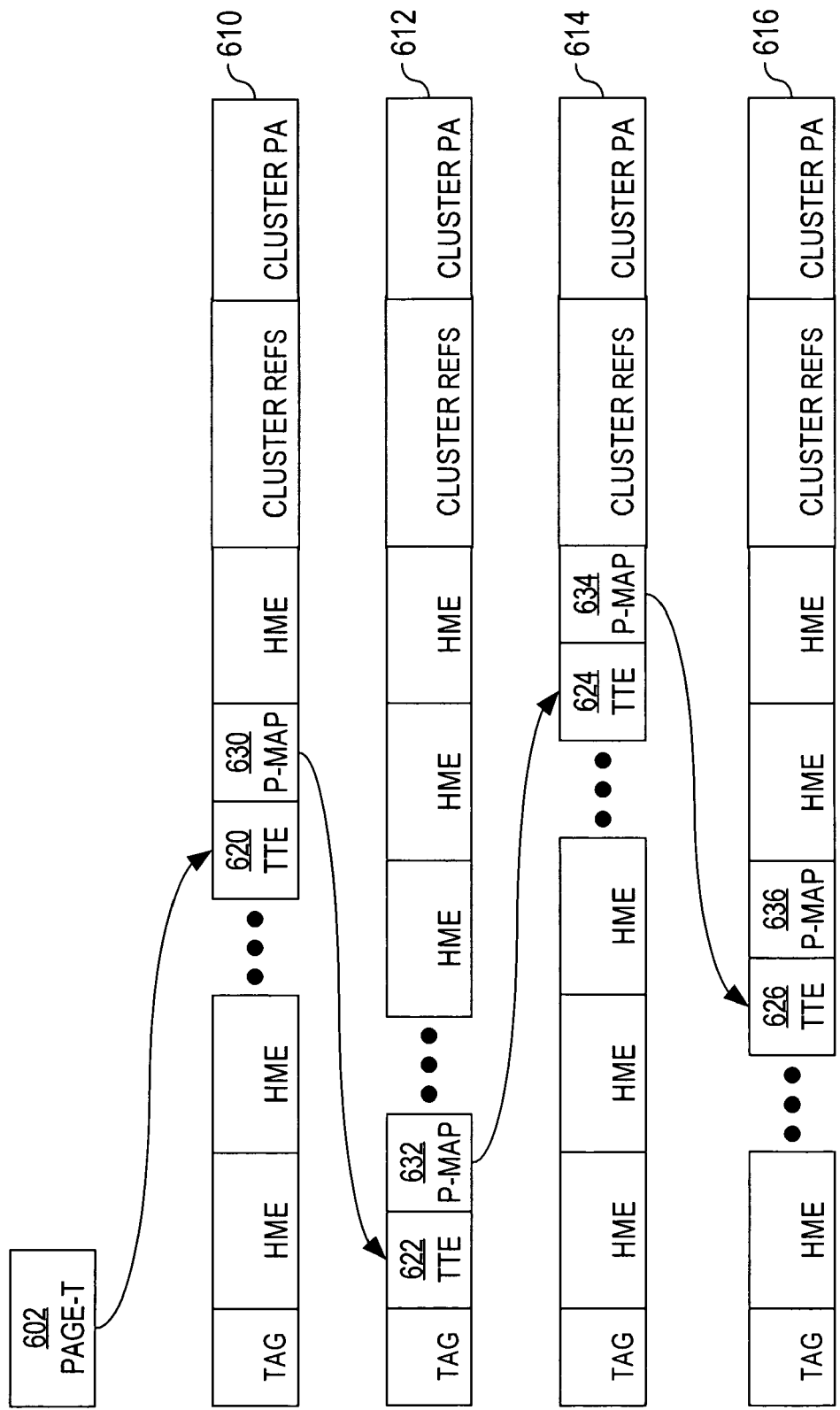
FIG. 6 is a block diagram that illustrates an example of a linked list of TTEs, according to an embodiment of the invention.

FIG. 6 is a block diagram that illustrates an example of a linked list of TTEs, according to an embodiment of the invention. Such a linked list also may be called a "p-mapping" list. A page-t structure 602 corresponds to a particular physical page. Page-t structure 602 refers to TTE 620 in HME cluster 610. P-map 630, which is in the same HME as TTE 620, refers to TTE 622 in HME cluster 612. P-map 632, which is in the same HME as TTE 622, refers to TTE 624 in HME cluster 614. P-map 634, which is in the same HME as TTE 624, refers to TTE 626 in HME cluster 616. Thus, the p-mapping list to which page-t structure 602 refers comprises TTEs 620-626. Each of TTEs 620-626 corresponds to a separate virtual page that is mapped to the physical page to which page-t structure 602 corresponds. Thus, by traversing the p-mapping list to which page-t structure 602 corresponds, a relocation thread can discover all of the virtual pages that are mapped to the physical page to which page-t structure 602 corresponds.

In one embodiment of the invention, each page-t structure is associated with a separate mutex lock. In such an embodiment, no process or thread can traverse or modify a p-mapping list unless that process or thread has obtained the mutex lock that is associated with the page-t structure that refers to that p-mapping list.

According to one embodiment of the invention, whenever a mapping is established between a virtual page and a physical page, the virtual page's corresponding TTE is added to the p-mapping list to which the physical page's corresponding page-t structure refers. The virtual page's corresponding TTE may be added to the p-mapping list by locating the last TTE currently existing in the p-mapping list (i.e., the TTE whose corresponding p-map is currently "NULL"), and then updating the last TTE's corresponding p-map so that the last TTE's corresponding p-map refers to the virtual page's corresponding TTE.

In one embodiment of the invention, whenever an entire HME cluster is going to be removed from the linked list that contains that HME cluster, as described above, all of the p-mapping lists that contain any TTEs in that HME cluster are updated automatically so that those p-mapping lists no longer contain the TTEs in that HME cluster. For example, all of the p-maps that refer to those TTEs may be updated automatically to refer instead to other TTEs that are not contained in the HME cluster that is going to be removed.

HME Cluster Magazines

As is discussed above, a computing system may comprise multiple system boards, and each system board may comprise multiple physical pages and one or more CPUs. A CPU that is located on the same system board as a physical page is "local" relative to that physical page.

According to one embodiment of the invention, each CPU in the computing system is associated with one or more "HME cluster magazines." Each such HME cluster magazine is a pool of zero or more available HME clusters. An HME cluster magazine that is associated with a CPU that is local relative to a physical page is "local" relative to (a) that physical page and (b) any HME clusters that are contained in that physical page.

Each HME cluster magazine may contain up to a specified number of HME clusters. If a magazine contains the specified number of HME clusters, then that HME cluster magazine is full. In one embodiment of the invention, whenever an HME cluster is removed from the page tables, such as those depicted in FIG. 1, a determination is made as to whether any HME cluster magazine that is local relative to that HME cluster is not full. If at least one such HME cluster magazine is not full, then the HME cluster that was removed from the page tables is inserted into that HME cluster magazine.

Alternatively, if all of the HME cluster magazines that are local to the HME cluster are full, then the HME cluster is inserted into a "depot layer." The depot layer is also a pool of zero or more available HME clusters. However, unlike the HME cluster magazines, the depot layer is not specific to any system board.

According to one embodiment of the invention, whenever an HME cluster needs to be allocated to the virtual memory address space of a process, a determination is made as to whether there are any HME clusters in any of the HME cluster magazines that are associated with the CPU on which the process is executing. If there is at least one HME cluster in such an HME cluster magazine, then that HME cluster is removed from that HME cluster magazine and allocated to the process' virtual memory address space. The HME cluster is inserted into the page tables.

Alternatively, if all of the HME cluster magazines that are associated with the CPU on which the process is executing are empty, then an HME cluster is removed from the depot layer and allocated to the process' virtual memory address space. The HME cluster is inserted into the page tables. Typically, allocating an HME cluster from an HME cluster magazine is significantly faster than allocating an HME cluster from the depot layer.

Callback Registration

In one embodiment of the invention, for each process that performs DMA relative to a physical page, the p-mapping list to which that physical page's corresponding page-t structure refers contains a special TTE. The special TTE indicates (e.g., via a set bit) that it is a special TTE. The special TTE may also indicate the physical address of the physical page that contains the special TTE. Unlike other TTEs, the special TTE might not be contained within an HME cluster.

According to one embodiment of the invention, instead of containing the fields shown in FIG. 5, each special TTE contains a reference to a pre-handler mechanism and a reference to a post-handler mechanism. Such "callback" mechanisms may be implemented as object methods, for example. Each special TTE may also contain the values of any parameters that need to be passed to the callback mechanisms.

Before a particular process uses DMA relative to a physical page, that process provides, to a registration mechanism, references to the callback mechanisms that are customized for that particular process. The registration mechanism adds, to the p-mapping list to which the physical page's corresponding page-t structure refers, the special TTE that contains the references to the callback mechanisms.

In such an embodiment, whenever the contents of a "source" physical page are going to be relocated, the relocation thread traverses the source p-mapping list as described above. Whenever the relocation thread locates a special TTE in the source p-mapping list, the relocation thread invokes the pre-handler mechanism to which that special TTE refers. Each pre-handler mechanism, when invoked, causes its corresponding process to desist from attempting to access the "source" physical page (which may be identified as a parameter of the invocation of the pre-handler mechanism) using DMA until instructed otherwise.

After the contents of the "source" physical page have been moved to the "target" physical page, as described above, the relocation thread again traverses the source p-mapping list. This time, whenever the relocation thread locates a special TTE in the source p-mapping list, the relocation thread invokes the post-handler mechanism to which that special TTE refers. Each post-handler mechanism, when invoked, may instruct its corresponding process that the previously halted DMAs may resume. The post-handler mechanism for a particular process may invoke a mechanism that causes a physical memory address to be "re-fetched" so that relevant mappings are updated to refer to the "target" physical page instead of the "source" physical page.

Pre-Handler Lock Management

A process's pre-handler mechanism may be implemented in such a way that the pre-handler mechanism relocates the contents of a particular physical page itself. After the contents of a physical page have been relocated, the memory that the physical page occupied may be freed for other purposes. That memory may be added to a "page free list" that processes may consult when seeking for memory to allocate.

Under such circumstances, there is nothing for the relocation thread to do after calling the pre-handler mechanism; the contents of the physical page already have been relocated by the time the pre-handler mechanism finishes.

Usually, prior to calling a process' pre-handler mechanism, the relocation thread acquires a mutex lock that corresponds to the physical page whose contents are going to be relocated. If the pre-handler mechanism then attempts to acquire the mutex lock before moving the contents of the physical page, then the pre-handler mechanism may end up "blocking" indefinitely, because the relocation thread that invoked the pre-handler mechanism already has acquired the mutex lock for that physical page.

To prevent this indefinite blocking from occurring, in one embodiment of the invention, the relocation thread "downgrades" a physical page's mutex lock to a "shared" lock prior to invoking a process' pre-handler mechanism. This allows the pre-handler mechanism to relocate the physical page's contents even though the relocation thread already holds a lock relative to the physical page. When the pre-handler mechanism is finished moving the content of the physical page, the pre-handler mechanism frees the physical page's memory.

According to one embodiment of the invention, after the pre-handler mechanism has finished, the relocation thread checks whether the physical page's memory has been freed. The relocation thread may do so by examining the status of a "p-free" bit that corresponds to the physical page. The "p-free" bit is located in a metadata structure (e.g., a "kmem-cache" structure) that is maintained outside of the physical page whose contents are relocated—when the pre-handler mechanism frees the physical page's memory, the pre-handler mechanism sets the "p-free" bit that corresponds to the physical page. If the relocation thread determines that the "p-free" bit is set, then the relocation thread does not attempt to move the contents of the now-freed physical page or to invoke any process' post-handler mechanism. In this case, the relocation thread releases the lock on the physical page. Alternatively, if the relocation thread determines that the "p-free" bit is not set, then the relocation thread "upgrades" the physical page's shared lock back to a mutex lock and proceeds to relocate the contents of the physical page in the manner described above.

In one embodiment of the invention, to prevent other processes from accessing the physical page prematurely, prior to releasing the lock on the physical page, the relocation thread sets a "p-tran" bit that corresponds to the physical page. Like the "p-free" bit, the "p-tran" bit is located in a metadata structure (e.g., a "kmem-cache" structure) that is maintained outside of the physical page whose contents are relocated. While the "p-tran" bit for a particular physical page is set, it signals to processes that the particular physical page is in a transitory state and should not be used to allocate memory.

In one embodiment of the invention, whenever any process or thread would allocate memory within a particular physical page, the status of the "p-tran" bit that corresponds to the particular physical page is examined first. If the "p-tran" bit is set, then that process or thread is provided another physical page in which to allocate memory—the particular physical page remains in the "page free list." In one embodiment of the invention, when the relocation thread determines that the "p-free" bit for a physical page is set, as described above, the relocation thread acquires the mutex lock for the physical page and clears the "p-tran" bit so that the "p-tran" bit is no longer set.

Retiring Physical Pages

When the contents of a physical page are being relocated, the contents may be relocated HME cluster-by-HME cluster. Unless something is done to prevent it, a process may attempt to allocate an HME cluster in the "source" physical page before all of the HME clusters in that page have been relocated.

Thus, in one embodiment of the invention, prior to relocating the contents of a physical page, the relocation thread invokes a "retirement" mechanism. The relocation thread may pass, as a parameter to the retirement mechanism, a virtual address range that corresponds to the physical page. The retirement mechanism updates kernel metadata so that the memory allocation subsystem does not allow any further memory allocations in the physical page to which that virtual address range is mapped. Thus, the physical page is "retired." As a result, when a process attempts to allocate an HME cluster, the memory allocation subsystem allocates the HME cluster in a physical page other than a "retired" physical page.

Additionally, in one embodiment of the invention, when an HME cluster in a "retired" physical page is freed, that HME cluster is placed in the depot layer instead of an HME cluster magazine. If this were not so, then the reference count for the HME cluster might never drop to zero, and the HME cluster might be stuck forever in an HME cluster magazine, and the memory of the physical page that contains the HME cluster might never be freed.

In one embodiment of the invention, whenever an available HME cluster is being sought in the depot layer, before that HME cluster is allocated and placed in the page tables, a determination is made as to whether the physical page in which that HME cluster is located is "retired." If that physical page is "retired," then another HME cluster in a different physical page is found instead.

Kmem_Cache_Reloc( )

Figure 7A:
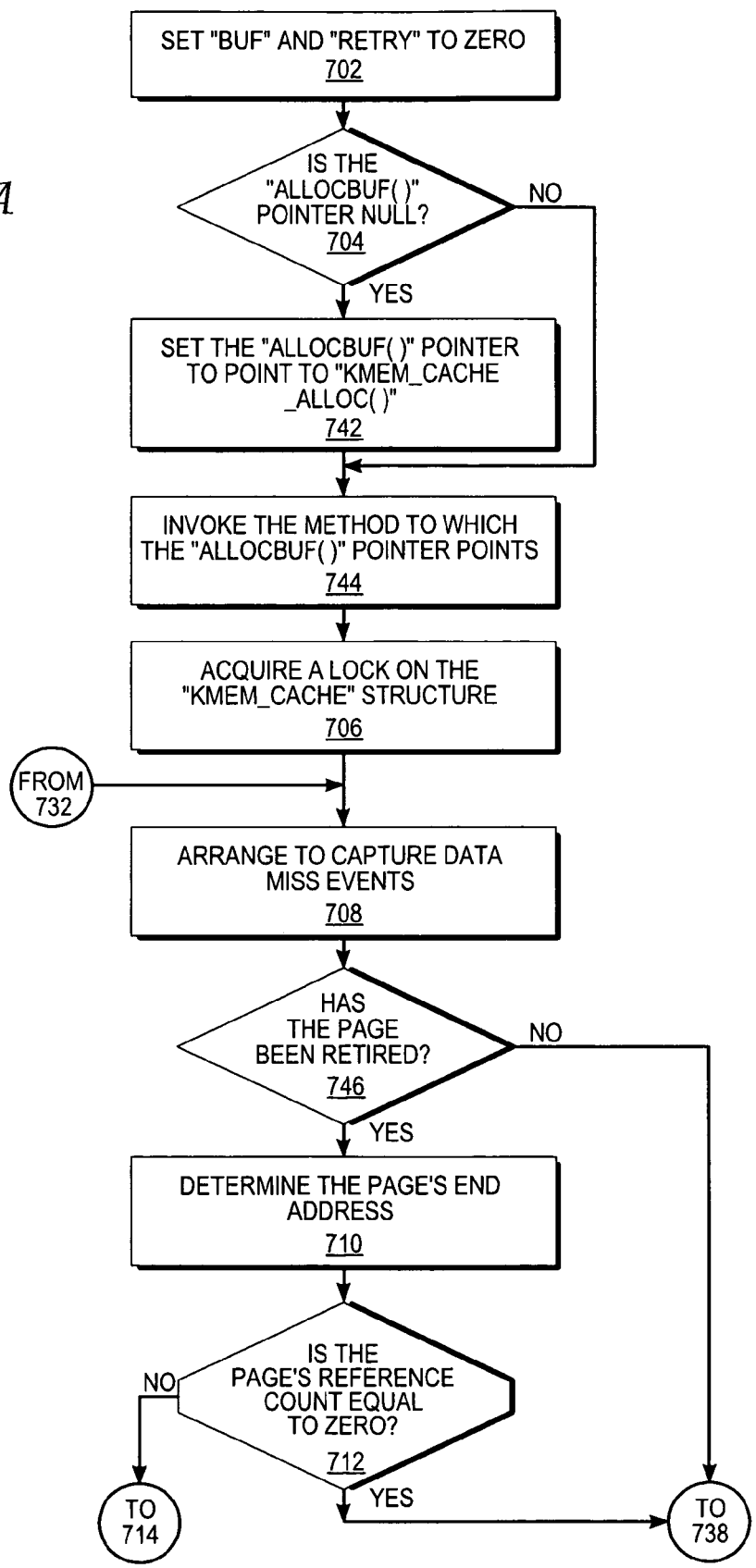
FIGS. 7A-C collectively show a flow diagram that illustrates an example of the behavior of a "kmem_cache_reloc( )" method that relocates the contents of a physical page, according to an embodiment of the present invention.
Figure 7B:
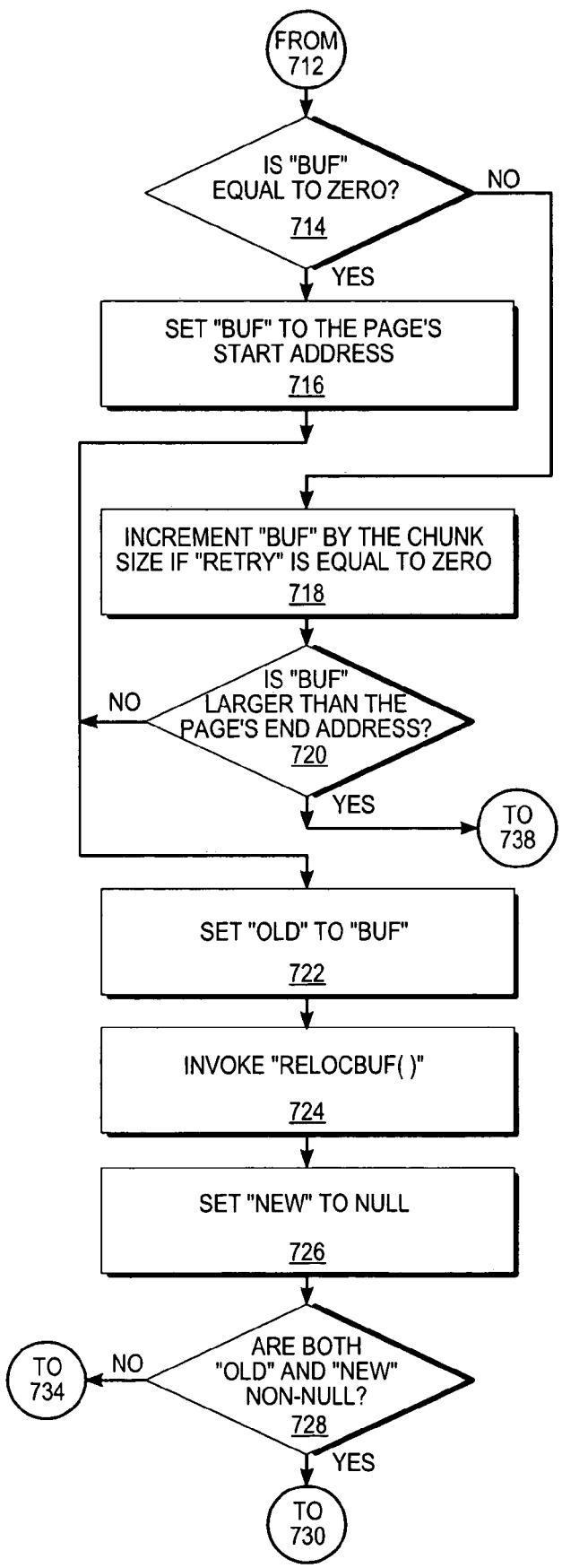
Figure 7C:
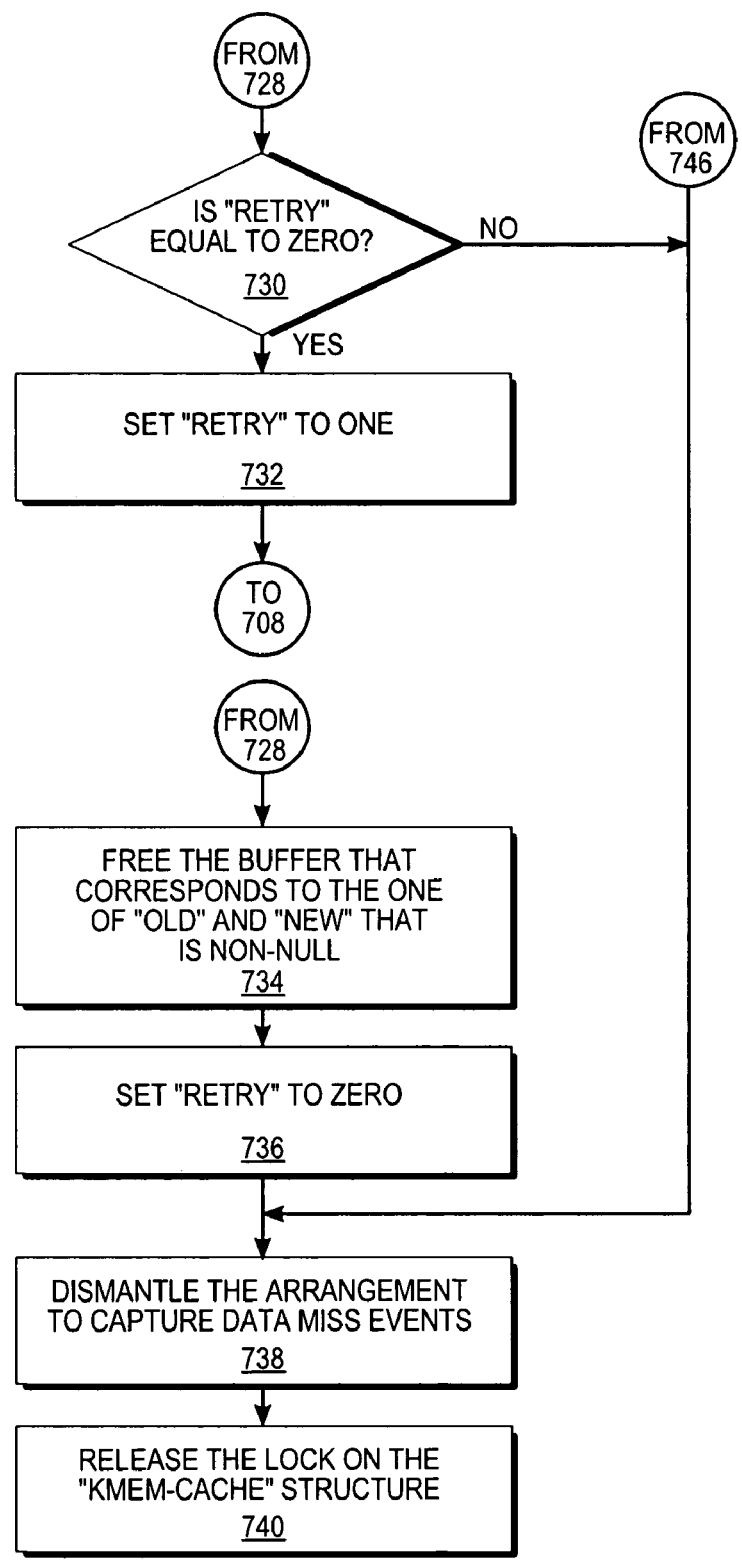

FIGS. 7A-C collectively show a flow diagram that illustrates an example of the behavior of a "kmem_cache_reloc( )" method that relocates the contents of a physical page, according to an embodiment of the present invention. In one embodiment of the invention, for each buffer in a "source" physical page, kmem_cache_reloc( ) moves the contents of that buffer to a corresponding buffer in a "target" physical page, buffer-by-buffer. As is described below, kmem_cache_reloc( ) may intercept certain events in case the buffers in the physical page vanish for any reason during the relocation.

In one embodiment of the invention, kmem_cache_reloc( ) accepts, as parameters, a pointer to a "kmem-cache" structure, the starting address of a physical page, a pointer to an "allocbuf( )" method, and a pointer to a "relocbuf( )" method. Where implemented, "allocbuf( )" is method that allocates memory for a particular kind of buffer, such as an HME cluster, and "relocbuf( )" is a method that relocates a particular kind of buffer, such as an HME cluster. Each different type of buffer may have separate corresponding "allocbuf( )" and "relocbuf( )" methods. Some types of buffers might not have any such corresponding methods implemented.

When invoked, in block 702, kmem_cache_reloc( ) initially sets two local variables, "buf" and "retry," to zero. Next, in block 704, kmem_cache_reloc( ) determines whether the pointer to the "allocbuf( )" method is null. If the pointer is null, then control passes to block 742. Otherwise, control passes to block 744.

In block 742, kmem_cache_reloc( ) sets the "allocbuf( )" pointer to the method "kmem_cache_alloc( )," which is a generic method that allocates memory for a generic buffer. Control passes to block 744.

In block 744, kmem_cache_reloc( ) invokes the method to which the "allocbuf( )" pointer points. That method allocates a new buffer. For example, the new buffer may be an HME cluster. Kmem_cache_reloc( ) sets the value of a variable "new" to point to the new buffer. Control passes to block 706.

Next, in block 706, kmem_cache_reloc( ) acquires a lock on the "kmem-cache" structure that was passed as a parameter to kmem_cache_reloc( ). Next, in block 708, kmem_cache_reloc( ) arranges to capture any "data miss" events (e.g., page faults) that pertain to the physical page that is identified by the starting address that was passed as a parameter to kmem_cache_reloc( ). This capture arrangement may be made using an "on_trap" mechanism such as is provided by the Sun Solaris OS. As a result, when such data miss events occur, the events may be passed to kmem_cache_reloc( ) instead of the existing miss handlers (e.g., the page fault handler), and kmem_cache_reloc( ) may handle the misses in a customized manner.

Inside of the "kmem-cache" structure that was passed as a parameter to kmem_cache_reloc( ) is a field called "cache_slabretire" that corresponds to the physical page. In one embodiment of the invention, this field is set to "one" when the corresponding physical page is "retired." In block 746, kmem_cache_reloc( ) examines this field. If this field is set to "zero," then the physical page has not been retired, and something has gone wrong. In such a case, control passes to block 738.

Otherwise, in block 710, kmem_cache_reloc( ) finds, in the "kmem-cache" structure, a pointer to a "kmem_slab" structure that corresponds to the physical page. The "kmem_slab" structure contains a field called "slab_base," which indicates the base address of the physical page. By adding the value of a field called "cache_slabsize" (in the "kmem-cache" structure) to the value of the "slab_base" field, kmem_cache_reloc( ) determines the end address in the physical page.

The physical page is associated with a reference count. In block 712, kmem_cache_reloc( ) examines the physical page's reference count. If the reference count is zero, then the physical page's memory has already been freed. In such a case, control passes to block 738.

Otherwise, in block 714, kmem_cache_reloc( ) determines whether the value of "buf" is zero. If the value of "buf" is zero, then, in block 716, kmem_cache_reloc( ) sets the value of "buf" to the value of "slab_base," and control passes to block 722.

Alternatively, if the value of "buf" is not zero, then, in block 718, if the value of "retry" is zero, then kmem_cache_reloc( ) increments "buf" by the value of a "cache_chunksize" field that is stored in the "kmem-cache" structure. The value of "cache_chunksize" indicates the size of the buffers in the physical page. Control passes to block 720.

In block 720, kmem_cache_reloc( ) determines whether the value of "buf" is larger than the end address of the physical page, as determined in block 710. If the value of "buf" is larger than the end address, then control passes to block 738.

Otherwise, in block 722, kmem_cache_reloc( ) sets the value of "old" to the value of "buf." Control passes to block 724.

In block 724, kmem_cache_reloc( ) invokes the "relocbuf( )" method. The "kmem-cache" structure, a pointer to variable "old," and a pointer to variable "new" are passed as parameters to the "relocbuf( )" method. The "relocbuf( )" method moves data from a source buffer (e.g., HME cluster) that is located at the address corresponding to the value of "old" to a destination buffer (e.g., HME cluster) that is located at the address corresponding to the value of "new."

In block 726, kmem_cache_reloc( ) sets the value of "new" to null.

In block 728, kmem_cache_reloc( ) determines whether both the values of "old" and "new" are non-null. If both the values of "old" and "new" are non-null, then control passes to block 730. Otherwise, control passes to block 734.

In block 730, kmem_cache_reloc( ) determines if the value of "retry" is zero. If the value of "retry" is zero, then control passes to block 732. Otherwise, control passes to block 738.

In block 732, kmem_cache_reloc( ) sets the value of "retry" to one. Control passes back to block 708.

Alternatively, in block 734, kmem_cache_reloc( ) frees the buffer that corresponds to the one of "old" and "new" that is non-null. Control passes to block 736.

In block 736, kmem_cache_reloc( ) sets the value of "retry" to zero.

In block 738, the arrangement to capture any "data miss" events, which was performed in block 708, is dismantled, so that the default miss handler mechanisms resume handling the appropriate "data miss" events.

In block 740, kmem_cache_reloc( ) releases the lock on the "kmem-cache" structure (kmem_cache_reloc( ) acquired this lock in block 706). In one embodiment of the invention, the buffer that is located at the address indicated by variable "new" is freed. Kmem_cache_reloc( ) returns gracefully.

Relocbuf( )

Figure 8A:
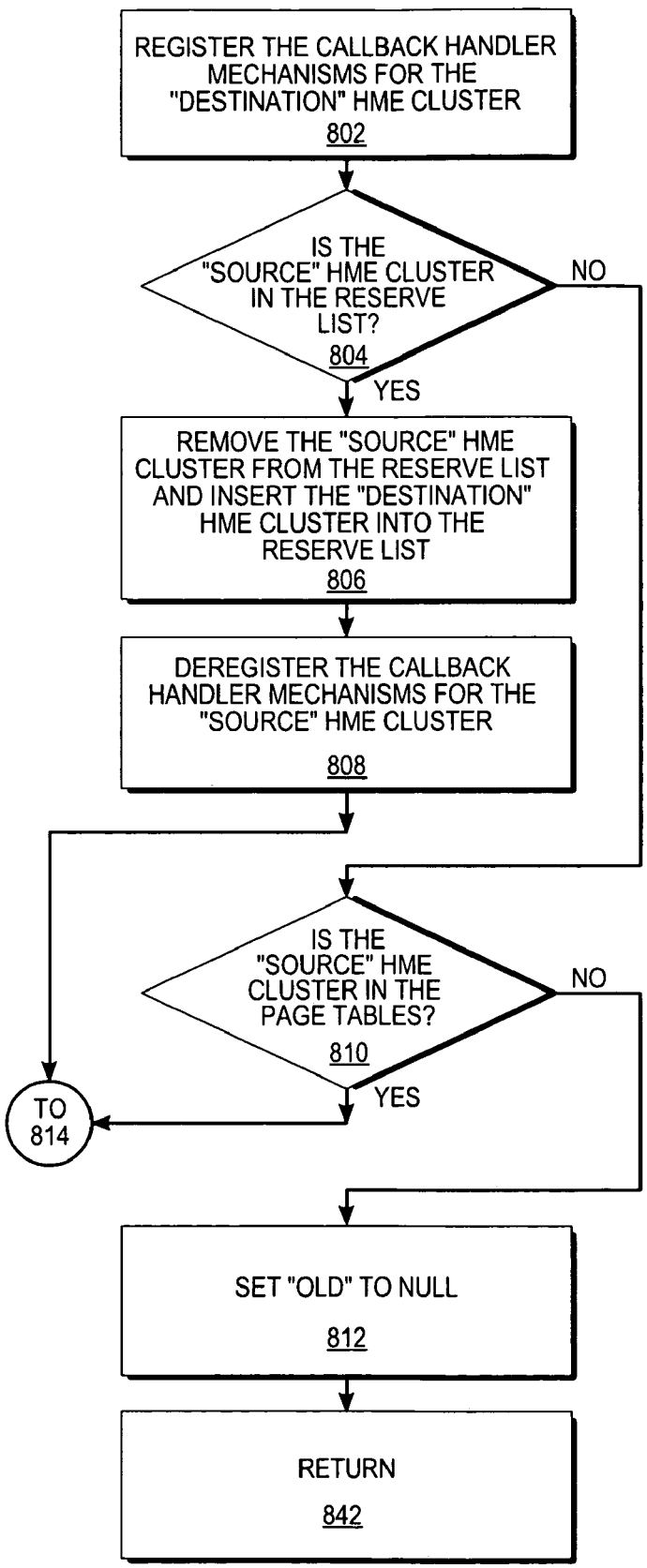
FIGS. 8A-C collectively show a flow diagram that illustrates an example of the behavior of a "relocbuf( )" method that is implemented specifically to relocate an HME cluster, according to an embodiment of the present invention.
Figure 8B:
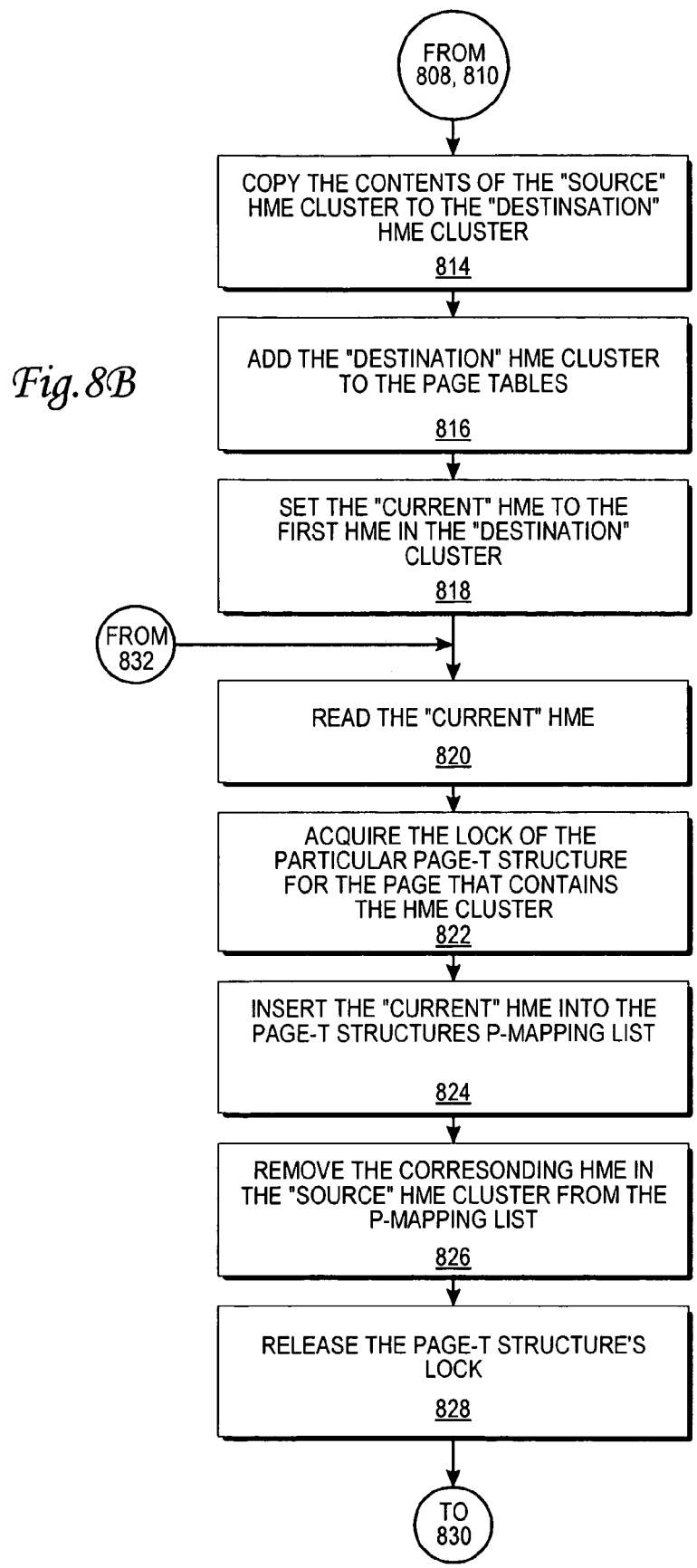
Figure 8C:
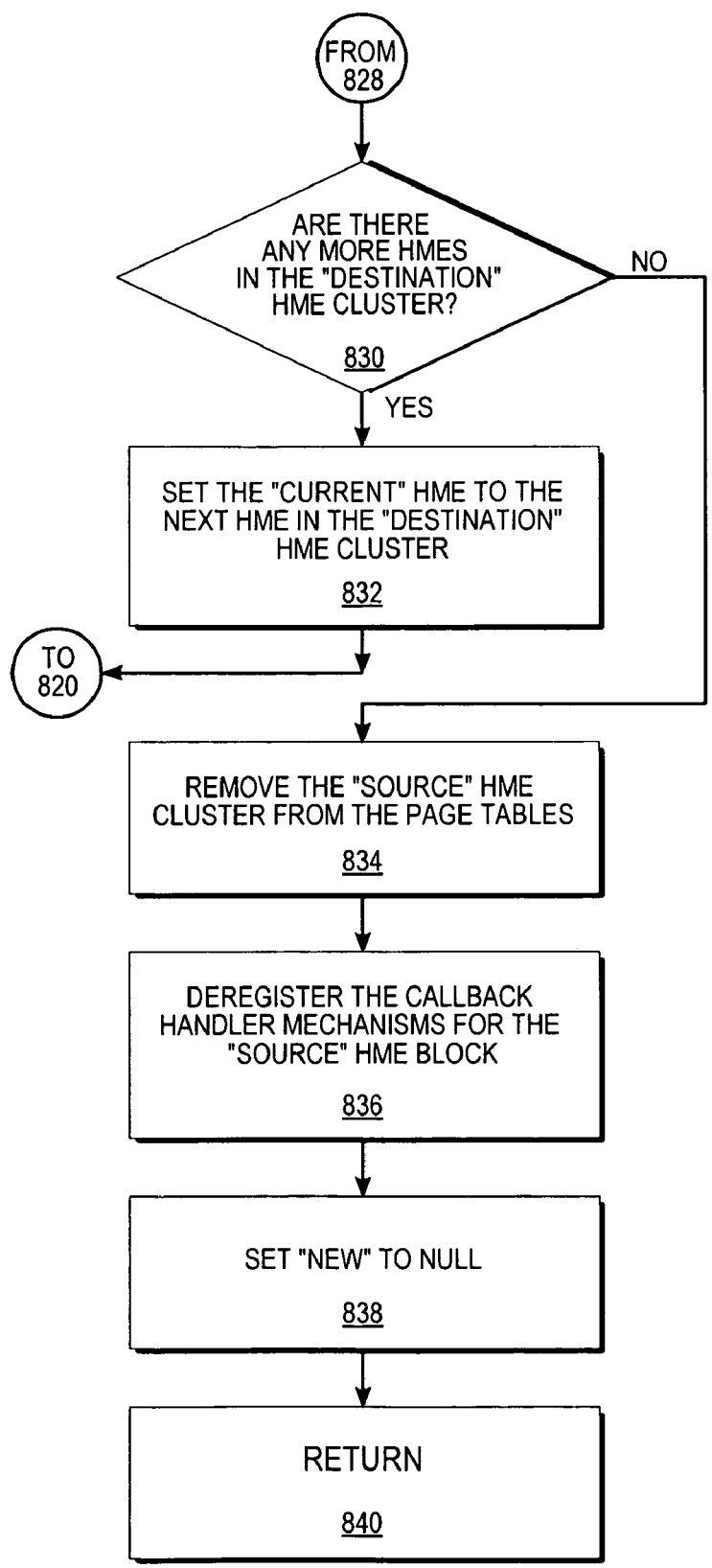

As is described above, in one embodiment of the invention, kmem_cache_reloc( ) invokes a method called "relocbuf( )" in block 724. FIGS. 8A-C collectively show a flow diagram that illustrates an example of the behavior of a "relocbuf( )" method that is implemented specifically to relocate the contents of an HME cluster, according to an embodiment of the present invention.

The "source" HME cluster whose contents are going to be relocated may a part of any one of several logical entities. The "source" HME cluster may be in a linked list to which one of HME hash bucket headers 102A-N refers. The "source" HME cluster may be in a statically allocated array of HME clusters (the "reserve list"). The "source" HME cluster may be in an HME cluster magazine. The "source" HME cluster may be in the depot layer.

As is discussed above, the value of "old," which is passed as a parameter to relocbuf( ), indicates the physical address of the "source" HME cluster, regardless of which logical entity the "source" HME cluster is a part. The value of "new," which is also passed as a parameter to relocbuf( ), indicates the physical address of the "destination" HME cluster.

In block 802, relocbuf( ) registers the callback handler mechanisms for the "destination" HME cluster.

In block 804, relocbuf( ) determines whether the "source" HME cluster is in the "reserve list." If the "source" HME cluster is in the "reserve list," then the "source" HME cluster is not currently being used to store data. If the "source" HME cluster is in the "reserve list," then control passes to block 806. Otherwise, control passes to block 810.

In block 806, relocbuf( ) removes the "source" HME cluster from the "reserve list," and inserts the "destination" HME cluster into the "reserve list" in the place of the "source" HME cluster.

In block 808, relocbuf( ) deregisters the callback handler mechanisms for the "source" HME cluster. Control passes to block 814.

Alternatively, in block 810, relocbuf( ) determines whether the "source" HME cluster is in the page tables (i.e., the linked lists of HME clusters 104 to which HME hash bucker headers 102A-N refer). If the "source" HME cluster is in the page tables, then the "source" HME cluster is currently being used to store data.

To attempt to locate the "source" HME cluster in the page tables, relocbuf( ) may read the tag of the HME buffer that is located at the physical address to which the variable "old" points, and then examine the tags of each HME cluster in the linked list to which the appropriate HME hash bucket header refers. If relocbuf( ) finds an HME cluster that has the matching tag, then relocbuf( ) has located the "source" HME cluster in the page tables.

However, if relocbuf( ) does not find an HME cluster with the right tag, then the "source" HME cluster might be in a linked list to which another HME hash bucket header refers; the "source" HME cluster's tag might have been changed after relocbuf( ) read the tag. This may occur if, after relocbuf ( ) read the tag, some other process obtained the lock on the HME cluster, freed the HME cluster, reallocated the HME cluster (thus changing the tag), and then released the lock.

In one embodiment of the invention, relocbuf( ) can determine whether the "source" HME cluster's tag was changed by comparing the tag for which relocbuf( ) is searching with the tag that is stored in the HME buffer that is located at the physical address to which the variable "old" points. If the tags are different, then relocbuf( ) concludes that the "source" HME cluster's tag was changed. In this case, relocbuf( ) attempts to use the changed tag to locate the HME cluster in the page tables.

If the "source" HME cluster is in the page tables, then control passes to block 814. Otherwise, control passes to block 812.

Another possibility, if relocbuf( ) cannot find the find an HME cluster with the right tag in the page tables, is that the "source" HME cluster might have been freed by another process after relocbuf( ) read the tag of the HME buffer that is located at the physical address to which the variable "old" points. If the tag has not changed, then this is the only possibility, for otherwise, relocbuf( ) would have found the "source" HME cluster in the first linked list of HMEs that relocbuf( ) searched. In this case, the "source" HME cluster is either in an HME cluster magazine or the depot layer.

If the HME cluster is either in an HME cluster magazine or the depot layer, then relocbuf( ) does not need to relocate the contents of the "source" HME cluster; in this case, the "source" HME cluster has been freed. Thus, in block 812, relocbuf( ) sets "old" to null, and in block 842, relocbuf( ) simply returns control to the process or thread that invoked relocbuf( ); typically, relocbuf( ) will return control to kmem_cache_reloc( ). Setting "old" to null causes kmem_cache_reloc( ) to free the buffer that corresponds to "new," as discussed above with reference to block 734 of FIG. 7.

Alternatively, in block 814, the "source" HME cluster has been located in either the "reserve list" or the page tables. Under such circumstances, the contents of the "source" HME cluster actually need to be relocated. Therefore, in block 814, relocbuf( ) copies (e.g., using a "block copy" memory operation) the contents of the "source" HME cluster to the "destination" HME cluster, to which the parameters "old" and "new" respectively point.

In block 816, relocbuf( ) adds the "destination" HME cluster to the page tables by hashing the "destination" HME cluster's tag and inserting the "destination" HME cluster into the linked list to which the corresponding HME hash bucket header refers. Because the tag of the "destination" HME cluster is the same as the tag of the "source" HME cluster after the copying operation, the "destination" HME cluster is placed in the same linked list in which the "source" HME cluster is located.

In block 818, relocbuf( ) sets the "current" HME to the first HME in the "destination" HME cluster. For example, relocbuf( ) might set the "current" HME to HME 204A in FIG. 2.

In block 820, relocbuf( ) reads the "current" HME.

As is discussed above in connection with FIG. 6, in one embodiment of the invention, each page-t structure is associated with a separate mutex lock. In block 822, relocbuf( ) acquires the mutex lock that is associated with the particular page-t structure that corresponds to the physical page in which the HME cluster is located.

In block 824, relocbuf( ) inserts the "current" HME into the p-mapping list to which the particular page-t structure refers. P-mapping lists are discussed above with reference to FIG. 6.

In block 826, relocbuf( ) removes the corresponding HME in the "source" HME cluster from the p-mapping list to which the particular page-t structure refers. For example, if the "current" HME is the first HME in the "destination" HME cluster, then relocbuf( ) removes the first HME in the "source" HME cluster from the p-mapping list.

In block 828, relocbuf( ) releases the mutex lock that is associated with the particular page-t structure.

In block 830, relocbuf( ) determines whether there are any more HMEs after the "current" HME in the destination HME cluster. If there are one or more HMEs in the destination HME cluster, then control passes to block 832. Otherwise, control passes to block 834.

In block 832, relocbuf( ) sets the "current" HME to the HME that follows the "current" HME in the "destination" HME cluster. For example, if the "current" HME is HME 204A, as shown in FIG. 2, then relocbuf( ) may set the "current" HME to be HME 204B. Control passes back to block 820.

Alternatively, in block 834, after all of the "source" HMEs have been removed from p-mapping lists and all of the "destination" HMEs have been inserted into p-mapping lists, relocbuf( ) removes the "source" HME cluster from the page tables. For example, relocbuf( ) may remove the "source" HME cluster from the linked list in which the "source" HME cluster is located, as shown in FIG. 1.

In block 836, relocbuf( ) deregisters the callback handler mechanisms for the "source" HME block.

In block 838, relocbuf( ) sets the value of "new" to null, and, in block 840, relocbuf( ) returns control to the process or thread that invoked relocbuf( ); typically, relocbuf( ) will return control to kmem_cache_reloc( ). Setting "new" to null causes kmem_cache_reloc( ) to free the buffer that corresponds to "old," as discussed above with reference to block 734 of FIG. 7.

Using Static PAHMEs To Avoid Infinite Recursion

In one embodiment of the invention, the special TTEs are contained within special "physical access" HMEs, or "PAHMES," which are not contained within HME clusters like other HMEs are. Thus, when a callback mechanism is initially registered, as discussed above, a corresponding PAHME needs to be initialized. If there is no existing physical page that contains PAHMEs, then a physical page that contains PAHMEs needs to be initialized. Before the initialization can be completed, a virtual address within kernel virtual memory address space needs to be mapped to the physical address of this physical page.

Like any other virtual-to-physical page mapping, this mapping needs to be stored in a TTE before the mapping can be considered complete. As is discussed above with reference to FIG. 4, each TTE is contained within an HME. If there is no existing physical HME cluster (as would be the case when the computing system first boots up), then an HME cluster needs to be initialized. However, before the initialization of this HME cluster can be completed, a kernel process needs to register a callback mechanism for the HME cluster, because the kernel process will be using DMA to access the HME cluster. Before the callback mechanism can be registered, though, a corresponding PAHME needs to be initialized. As is apparent from the discussion above, an infinite recursive loop could be entered. The computing system's stack would grow with each iteration of such an infinite loop, until finally, the computing system would run out of memory resources, halt, and require rebooting.

A computing system may need several PAHMEs in which to store callback mechanisms for HME clusters that will be initialized while the computing system is booting up. For example, the computing system may need at least three PAHMEs specifically for this purpose. Therefore, according to one embodiment of the invention, multiple PAHMEs are statically (rather than dynamically) allocated when the computing system boots up. In one embodiment of the invention, a static array of three PAHMEs is allocated when the computing system boots up. Unlike the memory that is occupied when data structures are dynamically allocated, the memory that this static array occupies is never freed for other purposes.

In one embodiment of the invention, the statically allocated PAHMEs are used to temporarily store callback mechanisms for HME clusters that need to be initialized while the computing system boots up. As is discussed above, before the first physical page of PAHMEs can be dynamically allocated and initialized, an HME cluster needs to be dynamically allocated and initialized to store the mapping between a virtual page and the first physical page of PAHMEs, but before the HME cluster can be dynamically allocated and initialized, a callback mechanism for the HME cluster needs to be stored in a PAHME. Therefore, in one embodiment of the invention, one of the statically allocated PAHMEs is temporarily used to store the callback mechanism for the HME cluster.

In one embodiment of the invention, the callback mechanism for the HME cluster has been stored in a statically allocated PAHME when the HME cluster is dynamically allocated. Then, one or more physical pages of PAHMEs are dynamically allocated. Mappings between virtual pages and the dynamically allocated physical pages of PAHMEs are stored in the HME cluster. Once this has been done, the callback mechanisms that were temporarily stored in the statically allocated PAHME are moved to a PAHME in one of the dynamically allocated physical pages so that the statically allocated PAHME can be used to store other data if needed during the bootup process.

Thus, in one embodiment of the invention, the statically allocated PAHMEs may be used to temporarily store data that would be otherwise be stored in a dynamically allocated PAHME before any PAHMEs can be dynamically allocated. Use of the statically allocated PAHMEs especially for critical purposes avoids entry into the infinite recursive loop discussed above.

In one embodiment of the invention, after the first physical page of PAHMEs has been dynamically allocated, a subset of the PAHMEs in that page (for example, twenty such PAHMEs) are reserved to be used only under circumstances where the statically allocated PAHMEs otherwise would be used. This helps to prevent overuse of the statically allocated PAHMEs, which typically will be few in number. Thus, in such an embodiment, the statically allocated PAHMEs are not used after the first physical page of PAHMEs has been dynamically allocated unless all of the PAHMEs in the subset are currently being used to store data.

In one embodiment of the invention, one or more HMEs also may be statically allocated during bootup and used to store HME data temporarily until that data can be transferred to dynamically allocated HMEs.

Hardware Overview

Figure 9:
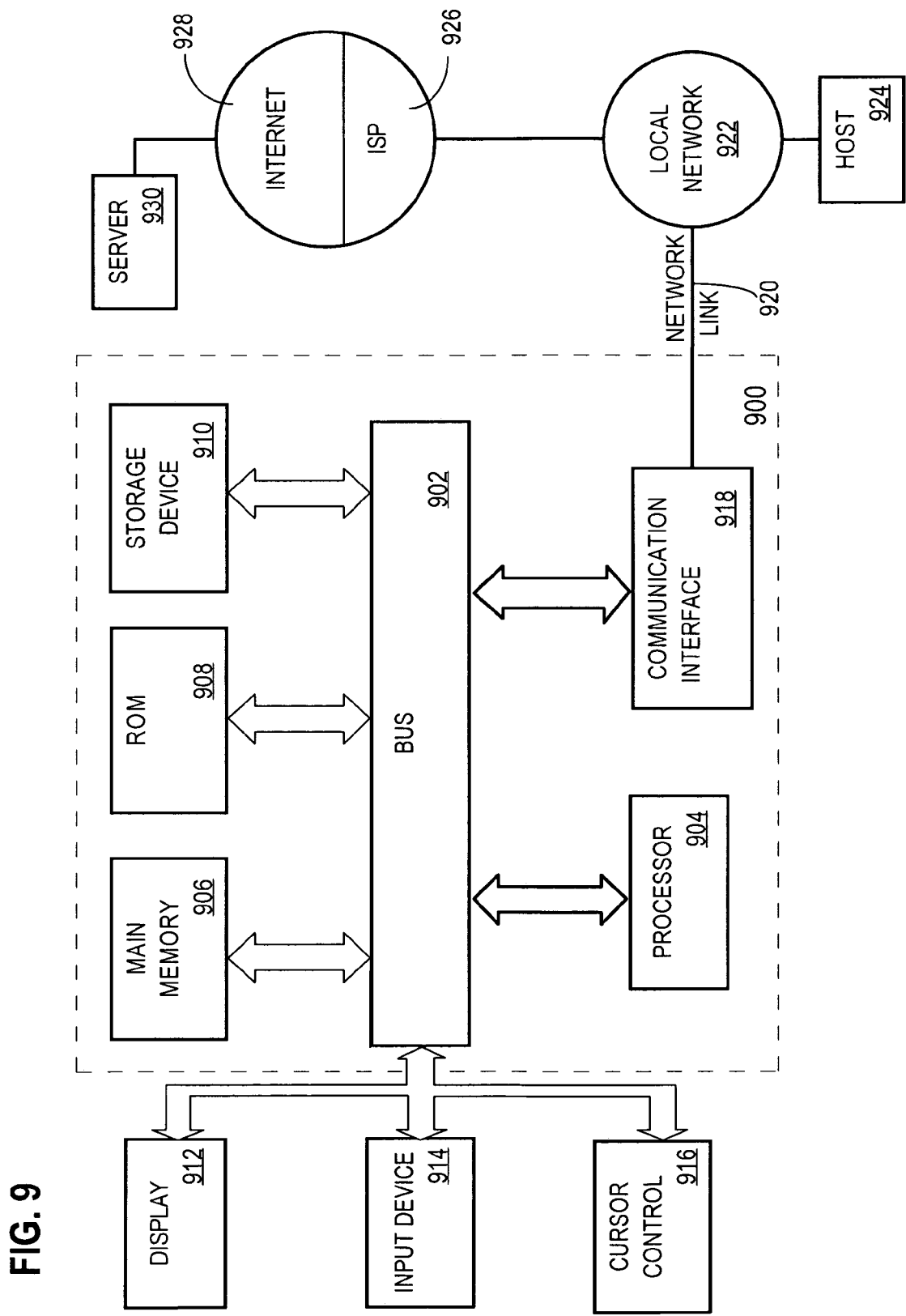
FIG. 9 is a hardware block diagram of an example computer entity, upon which certain embodiments of the invention may be implemented.

FIG. 9 is a block diagram that illustrates a computer system 900 upon which an embodiment of the invention may be implemented. Computer system 900 includes a bus 902 for facilitating information exchange, and one or more processors 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions by processor 904. Computer system 900 may further include a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

In computer system 900, bus 902 may be any mechanism and/or medium that enables information, signals, data, etc., to be exchanged between the various components. For example, bus 902 may be a set of conductors that carries electrical signals. Bus 902 may also be a wireless medium (e.g. air) that carries wireless signals between one or more of the components. Bus 902 may also be a medium (e.g. air) that enables signals to be capacitively exchanged between one or more of the components. Bus 902 may further be a network connection that connects one or more of the components. Overall, any mechanism and/or medium that enables information, signals, data, etc., to be exchanged between the various components may be used as bus 902.

Bus 902 may also be a combination of these mechanisms/media. For example, processor 904 may communicate with storage device 910 wirelessly. In such a case, the bus 902, from the standpoint of processor 904 and storage device 910, would be a wireless medium, such as air. Further, processor 904 may communicate with ROM 908 capacitively. In this instance, the bus 902 would be the medium (such as air) that enables this capacitive communication to take place. Further, processor 904 may communicate with main memory 906 via a network connection. In this case, the bus 902 would be the network connection. Further, processor 904 may communicate with display 912 via a set of conductors. In this instance, the bus 902 would be the set of conductors. Thus, depending upon how the various components communicate with each other, bus 902 may take on different forms. Bus 902, as shown in FIG. 9, functionally represents all of the mechanisms and/or media that enable information, signals, data, etc., to be exchanged between the various components.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications. According to one embodiment of the invention, the transmission media referred to above are tangible (i.e., "substantially real") media.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 990 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for managing memory, comprising:
    allocating memory for a hardware mapping entry (HME) cluster of entries;
    storing, in the HME cluster of entries, a mapping between a virtual page and a physical page in a source HME cluster entry;
    selecting the source HME cluster entry from the HME cluster of entries;
    determining a location of the virtual page to be in a kernel virtual memory address space;
    marking the mapping as suspended and valid after determining the location of the virtual page;
    receiving a request from a process to access the physical page after marking the mapping;
    instructing the process to wait until the mapping is marked as unsuspended;
    dynamically allocating memory for a destination HME cluster entry;
    copying the mapping from the source HME cluster to the destination HME cluster in order to relocate the mapping from the source HME cluster to the destination HME cluster;
    inserting the destination HME cluster entry into the HME cluster of entries;
    removing the source HME cluster entry from the HME cluster of entries;
    marking the mapping as unsuspended and valid; and
    redirecting the request from the process to access the physical page to the destination HME cluster entry.

2. The method of claim 1, further comprising:
    acquiring a mutex lock;
    downgrading, after acquiring the mutex lock, the mutex lock to a shared lock; and
    allowing, after downgrading the mutex lock to a shared lock, the process to access the physical page.

3. The method of claim 1, further comprising:
    storing information indicating that the mapping is copied to the destination HME cluster.

4. The method of claim 1, further comprising:
    storing information indicating to a plurality of threads that the plurality of threads are to wait until the mapping is marked as unsuspended.

5. The method of claim 1, further comprising:
    handling page fault events with a handler thread instead of a page fault event mechanism.

6. The method of claim 1, further comprising:
    determining that a first plurality of buffers in a first HME cluster entry are currently allocated and not available for allocation; and
    moving the contents of the first plurality of buffers to a second plurality of buffers in a second HME cluster entry.

7. The method of claim 6, further comprising:
    reading a first tag value from a buffer, of the first plurality of buffers, that is located at a first memory address;
    generating a first hash value based on the first tag value; and
    determining that the buffer comprising the first tag value is referenced in a first list of buffers referred to by a hash bucket that corresponds to the first hash value.

8. A machine-readable storage medium storing instructions for managing memory, the instructions executable on a processor and comprising functionality to:
    allocate memory for a hardware mapping entry (HME) cluster of entries;
    store, in the HME cluster of entries, a mapping between a virtual page and a physical page in a source HME cluster entry;
    select the source HME cluster entry from the HME cluster of entries;
    determine a location of the virtual page to be in a kernel virtual memory address space;
    mark the mapping as suspended and valid after determining the location of the virtual page;
    receive a request from a process to access the physical page after marking the mapping;
    instruct the process to wait until the mapping is marked as unsuspended;
    dynamically allocate memory for a destination HME cluster entry;
    copy the mapping from the source HME cluster to the destination HME cluster in order to relocate the mapping from the source HME cluster to the destination HME cluster;
    insert the destination HME cluster entry into the HME cluster of entries;
    remove the source HME cluster entry from the HME cluster of entries;
    mark the mapping as unsuspended and valid; and
    redirect the request from the process to access the physical page to the destination HME cluster entry.

9. The machine-readable storage medium of claim 8, the instructions further comprising functionality to:
    acquire a mutex lock;
    downgrade, after acquiring the mutex lock, the mutex lock to a shared lock; and
    allow, after downgrading the mutex lock to a shared lock, the process to access the physical page.

10. The machine-readable storage medium of claim 8, the instructions further comprising functionality to:
    store information indicating that the mapping is copied to the destination HME cluster.

11. The machine-readable storage medium of claim 8, the instructions further comprising functionality to:

store information indicating to a plurality of threads that the plurality of threads are to wait until the mapping is marked as unsuspended.

12. The machine-readable storage medium of claim 8, the instructions further comprising functionality to:
handle page fault events with a handler thread instead of a page fault event mechanism.

13. The machine-readable storage medium of claim 8, the instructions further comprising functionality to:
determine that a first plurality of buffers in a first HME cluster entry are currently allocated and not available for allocation; and
move the contents of the first plurality of buffers to a second plurality of buffers in a second HME cluster entry.

14. The machine-readable storage medium of claim 13, the instructions further comprising functionality to:
read a first tag value from a buffer, of the first plurality of buffers, that is located at a first memory address;
generate a first hash value based on the first tag value; and
determine that the buffer comprising the first tag value is referenced in a first list of buffers referred to by a hash bucket that corresponds to the first hash value.

15. An apparatus for managing memory, comprising:
a mechanism for allocating memory for a hardware mapping entry (HME) cluster of entries, wherein the HME cluster of entries is associated with an HME hash bucket header, wherein the HME hash bucket header comprises a pointer to a list of the HME cluster of entries;
a mechanism for storing, in the HME cluster of entries, a mapping between a virtual page and a physical page in a source HME cluster entry;
a mechanism for selecting the source HME cluster entry from the HME cluster of entries;
a mechanism for determining a location of the virtual page to be in a kernel virtual memory address space;
a mechanism for marking the mapping as suspended and valid after determining the location of the virtual page;
a mechanism for receiving a request from a process to access the physical page after marking the mapping;
a mechanism for instructing the process to wait until the mapping is marked as unsuspended;
a mechanism for dynamically allocating memory for a destination HME cluster entry;
a mechanism for copying the mapping from the source HME cluster to the destination HME cluster in order to relocate the mapping from the source HME cluster to the destination HME cluster;
a mechanism for inserting the destination HME cluster entry into the HME cluster of entries;
a mechanism for removing the source HME cluster entry from the HME cluster of entries;
a mechanism for marking the mapping as unsuspended and valid; and
a mechanism for redirecting the request from the process to access the physical page to the destination HME cluster entry.

16. The apparatus of claim 15, further comprising:
a mechanism for acquiring a mutex lock;
a mechanism for downgrading, after acquiring the mutex lock, the mutex lock to a shared lock; and
a mechanism for allowing, after downgrading the mutex lock to a shared lock, the process to access the physical page.

17. The apparatus of claim 15, further comprising:
a mechanism for storing information indicating that the mapping is copied to the destination HME cluster.

18. The apparatus of claim 15, further comprising:
a mechanism for storing information indicating to a plurality of threads that the plurality of threads are to wait until the mapping is marked as unsuspended.

19. The apparatus of claim 15, further comprising:
a mechanism for handling page fault events with a handler thread instead of a page fault event mechanism.

20. The apparatus of claim 15, further comprising:
a mechanism for determining that a first plurality of buffers in a first HME cluster entry are currently allocated and not available for allocation; and
a mechanism for moving the contents of the first plurality of buffers to a second plurality of buffers in a second HME cluster entry.

21. The apparatus of claim 20, further comprising:
a mechanism for reading a first tag value from a buffer, of the first plurality of buffers, that is located at a first memory address;
a mechanism for generating a first hash value based on the first tag value; and
a mechanism for determining that the buffer comprising the first tag value is referenced in a first list of buffers referred to by
a hash bucket that corresponds to the first hash value.

* * * * *